United States Patent [19]

Haines et al.

[11] Patent Number: 4,478,211
[45] Date of Patent: Oct. 23, 1984

[54] SELF-PUMPING SOLAR HEATING SYSTEM WITH GEYSER PUMPING ACTION

[76] Inventors: Eldon L. Haines, 106 Alberta La., Eugene, Oreg. 97404; Ralph E. Bartera, 4840 Hampton Rd., La Canada, Calif. 91011

[21] Appl. No.: 389,630
[22] Filed: Jun. 18, 1982
[51] Int. Cl.³ ............................ F24J 3/02; F28D 13/00
[52] U.S. Cl. .................................. 126/433; 126/434; 165/104.22
[58] Field of Search ............... 126/433, 434, 450, 445; 165/104.24, 104.22

[56] References Cited

U.S. PATENT DOCUMENTS

| Re. 31,032 | 9/1982 | French | 126/434 |
|---|---|---|---|
| 4,237,866 | 12/1980 | Rush | 126/433 |
| 4,246,890 | 1/1981 | Kraus et al. | 126/433 |
| 4,270,521 | 6/1981 | Brekke | 126/433 |
| 4,270,522 | 6/1981 | Vandenberg | 126/434 |
| 4,305,382 | 12/1981 | Nott | 126/433 |
| 4,340,030 | 7/1982 | Molivades | 165/104.22 |
| 4,368,726 | 1/1983 | Ellsworth | 126/445 |

FOREIGN PATENT DOCUMENTS 43227 1/1982 European Pat. Off. ............ 126/450

Primary Examiner—Samuel Scott
Assistant Examiner—G. Anderson
Attorney, Agent, or Firm—James D. Givnan, Jr.

[57] ABSTRACT

A self-pumping solar heating system having a collector including a multitude of small diameter riser tubes from which heated liquid is pumped into a header by a geyser action. A vapor condenser assures a header pressure conducive to bubble nucleation in the riser tube upper end segments. The level of liquid within the header or its outlet is higher than the liquid level in the riser tubes to produce a gravity imbalance capable of circulating heated liquid past a storage heat exchanger, below the header, and then upwardly through the closed vapor condenser in the header prior to return to a collector inlet manifold. A modified header utilizes an open vapor condenser in vapor communication with the collector header.

2 Claims, 6 Drawing Figures

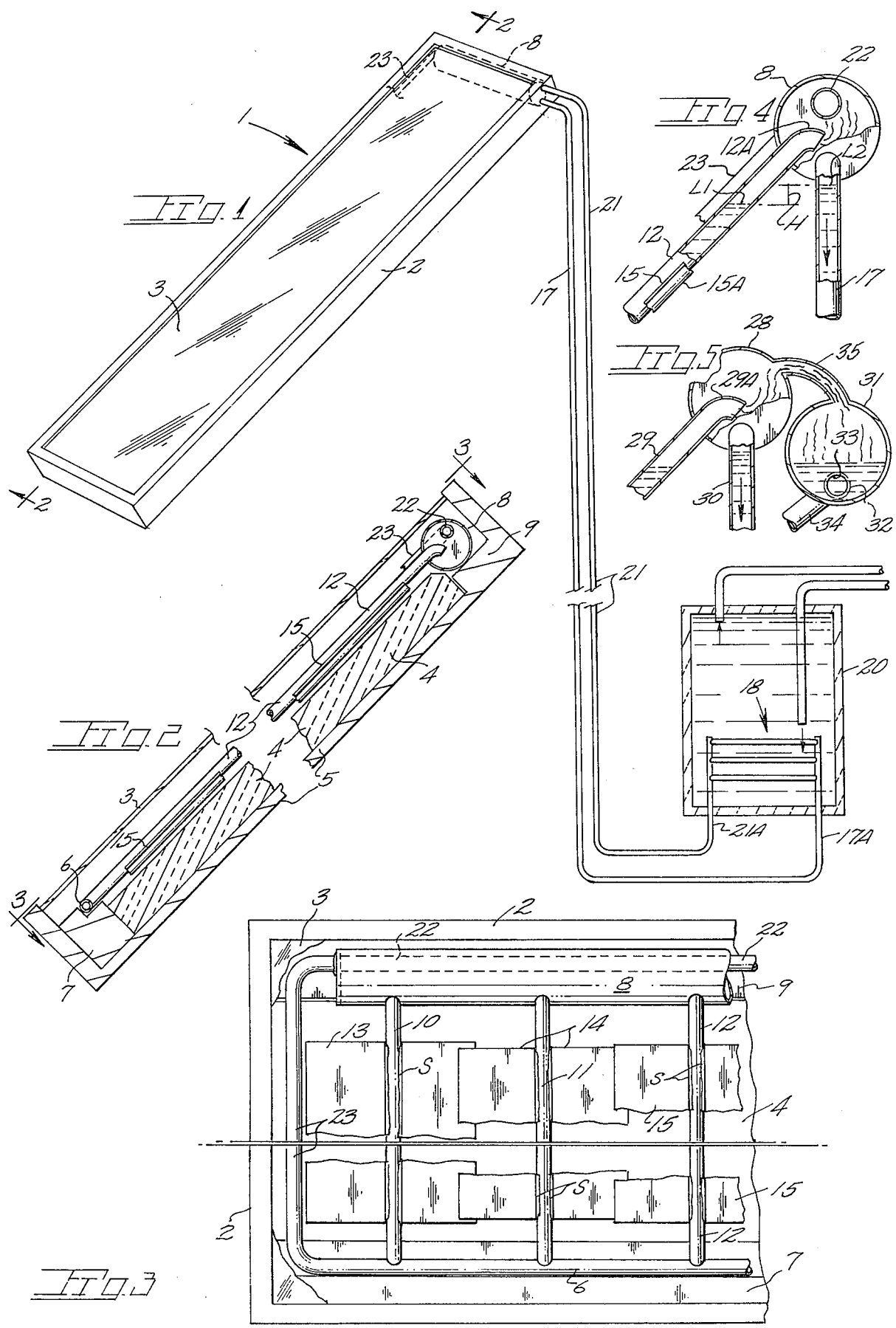

SELF-PUMPING SOLAR HEATING SYSTEM WITH GEYSER PUMPING ACTION

BACKGROUND OF THE INVENTION

The present invention concerns a self-pumping solar heating system for homes or commercial buildings relying on a gravity imbalance due to the geyser discharge of collector liquid into a header to pump the heated liquid to an end use such as a heat exchanger below the collector.

In general, solar heating systems utilize one of two systems for heat transfer, thermosiphon or pumped loop. The major drawback to the thermosiphon system is the physical disposition of components requiring overhead storage of the heated liquid. In the pumped loop system, the storage receptacle may be below the collector panel but the system incurs an external energy cost and the utilization of costly components such as pumps, controllers, valves, sensors, which eventually require maintenance or replacement.

Attempts to overcome the shortcomings of both systems have been made with solar heating systems which utilize a gas bubble flow such as disclosed in U.S. Pat. No. 4,246,890 wherein the bubble flow or stream is remote from a solar collector but serves to lift collector heated liquid. U.S. Pat. No. 4,224,925 discloses a "pumpless" system which relies on the gravity flow of liquid and on vapor entrainment for liquid circulation. U.S. Pat. No. 4,270,522 discloses a system wherein vapor pressure from a solar collector is used to operate a venturi pump to circulate water through a heat exchanger. U.S. Pat. No. 4,305,382 also discloses a system utilizing a venturi pump to circulate condensate through a solar panel. U.S. Pat. No. 4,270,521 discloses a system wherein a geyser action in conjunction with an ambient air pressure differential is used for water circulation. U.S. Pat. No. 4,237,866 is of interest in that it discloses a series of riser tubes in a solar collector from which tubes vapor and liquid are discharged by geyser action to impinge on a conduit passing through a header embodied heat exchanger which serves to circulate liquid only within the collector itself. The following described system in distinction utilizes geyser action to create a gravity imbalance which serves to circulate a single medium through the entire system.

SUMMARY OF THE PRESENT INVENTION

The present invention is embodied within a solar heating system wherein heated liquid is circulated through the system by a geyser pumping action producing a difference in liquid levels causing a gravity imbalance resulting in circulation of a heated liquid through the system without the use of pumps or controls.

A solar panel or collector receives insolation resulting in the heating of the liquid medium carried within a multitude of collector riser tubes. The upper ends of the tubes are in individual communication with a header.

A higher liquid level in the header or its outlet than in the tubes is generated by liquid slugs being propelled upwardly in the riser tubes by vapor from boiling of the heated liquid, creating a gravity imbalance between the liquid levels in the header and the riser tubes. The upward propulsion of liquid slugs by vapor in the riser tubes is termed geyser action or geyser pumping. The gravity imbalance is sufficient to cause liquid circulation through heat exchanger means in a storage receptacle and to overcome density differences and conduit friction. The header additionally serves to house a vapor condenser on which condense the vapors discharged from the riser tubes to control vapor pressure in the header and thus promote continued boiling in the risers. The heat of vaporization given up during condensation additionally serves to preheat the liquid returning to the collector. In the preferred form of the invention, the vapor condenser is a closed conduit through the header while a second form utilizes a vapor condenser which is in open communication with the header.

Important objectives include the provision of a solar heating system which is self-pumping by means of geyser pumping without use of electrical energy or pumps, yet which has the desirable features of a pumped loop system, namely optimum location of system components such as a storage receptacle located below the solar collector; the provision of a system which is self-regulating and operates on demand when the positive temperature difference between the solar collector and the storage receptacle is great enough, requiring no sensors, controllers, or valves; the provision of a system which does not thermosiphon or pump backward when not operating and, therefore, does not lose heat from the storage receptacle; the provision of a system which requires little or no maintenance, has a long lifetime and a low lifetime cost.

BRIEF DESCRIPTION OF THE DRAWING

In the Drawing:

FIG. 1 is a schematic of the present system with conduits sectioned for purposes of illustration;

FIG. 2 is a sectional view taken downwardly along line 2—2 of FIG. 1;

FIG. 3 is a plan view taken downwardly along line 3—3 of FIG. 2 with fragments broken away for convenience of illustration;

FIG. 4 is a vertical sectional view of the upper end of a typical riser tube, the header and the closed vapor condenser;

FIG. 5 is a view similar to FIG. 4 but showing a modified form of header and vapor condenser arrangement.

DETAILED DESCRIPTION OF THE PREFERRED EMBODIMENTS

Figure 6:
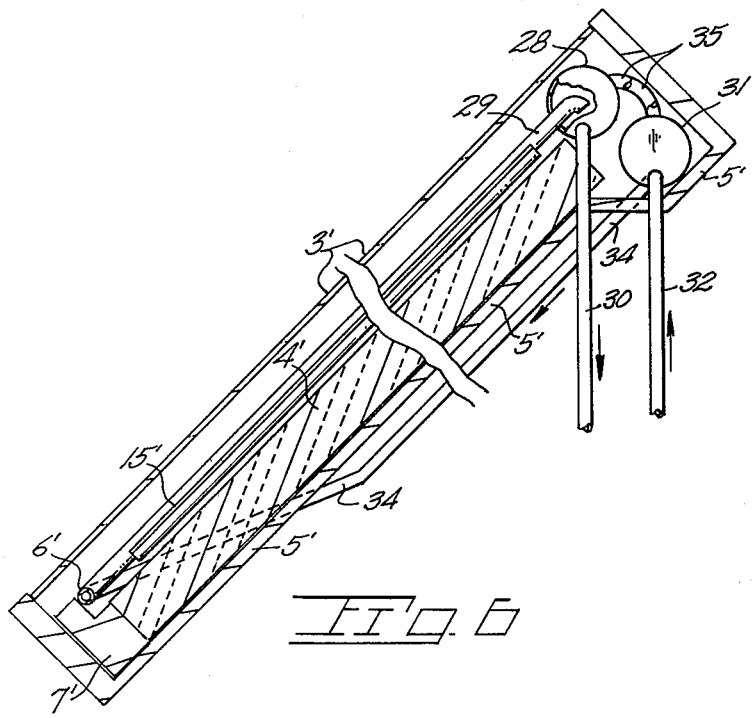
FIG. 6 is a view similar to FIG. 2 but showing the modified header and vapor condenser arrangement.

With continuing reference to the drawing wherein reference numerals indicate parts similarly identified in the following specification, the reference numeral 1 indicates generally a solar collector inclined for purposes of optimum insolation.

Collector 1 may be of any practical size and shape as the exterior configuration of same is not pertinent to a practical embodiment of the present system. A framework at 2 is adapted for installation on a supporting surface such as the roof structure of a home or commercial building. Glazing at 3 closes the interior of the collector. In similarity to known collectors, a layer of insulation is indicated at 4 in place on the collector inclined bottom wall at 5. An inlet manifold at 6 is supported in place by mounting means 7 and extends across the lower end of the collector. Extending across the upper end of the collector is a header 8 supported as at 9.

The inlet manifold and header 8 are interconnected by a multitude of parallel riser tubes some of which are shown at 10, 11 and 12 in FIG. 3 with riser tube end segments as at 12A extending through openings in said manifold and header and secured therein as by brazing or the like. In place along the length of each riser tube is a light gauge metal plate as at 13, 14 and 15. The riser tube upper end segments as at 12A terminate below a later described internal header conduit. Suitable engagement between plate and riser tube may be effected by the formation of each plate with a lengthwise extending channel as at 15A in FIG. 4 corresponding to the outside diameter of the riser tube to permit each plate channel to surfacially engage a substantial surface area of each riser tube for optimum heat conduction. The boundaries of each plate may be overlapped. Heat conduction from riser to plate is additionally enhanced by lines of solder at S.

A discharge conduit at 17 extends downwardly from header 8, as best shown in FIG. 1, which conduit has an upwardly extending segment 17A which terminates in communication with parallel heat exchanger coils indicated generally at 18 disposed within a storage tank 20.

A return conduit at 21 has a downwardly extending segment at 21A leading from storage tank coils 18 and thence upwardly for open communication with a vapor condenser shown as a conduit at 22.

Conduit 22 extends lengthwise through header 8 and terminates in open communication with a conduit segment at 23 located within the collector and which serves to return liquid down to manifold 6.

With attention to FIG. 4, it will be seen that the liquid level L1 in a typical riser tube is lower than a liquid level L2 the latter being the liquid level in conduit 17 (or in some instances in header 8). The level difference is identified at H. Accordingly, a gravitational imbalance is provided in conduit 17 by reason of the level difference between the liquid in conduit 17 and that in the series of riser tubes.

In the presence of adequate insolation, bubble nucleation occurs in the upper end segments of the riser tubes with bubble growth serving to propel slugs of liquid within the riser end segments upwardly for discharge of same into header 8. In essence, bubbles generated within a riser tube function as a pump with insolation as a power source. The condenser is in the form of conduit at 22, passing lengthwise through header 8, and prevents, during normal operation, the build-up of vapor pressure both within header 8 and the upper end segments of the riser tubes. The continuous transfer of the heat of condensation to the external surfaces of conduit 22 assures a vapor pressure low enough to promote bubble nucleation and growth. Bubble nucleation and hence the geyser pumping action terminates in the presence of pressure build-up in header 8 which build-up occurs when vapor exchanger conduit temperature is inadequate to condense riser tube emitted vapors.

A preferred form of the collector is shown in FIG. 5 which view corresponds to FIG. 4 of the first described collector. FIG. 6 also shows the modified form of the invention and corresponds to FIG. 2 of the first form of the invention with prime reference numerals identifying analagous parts. A header at 28 receives the individual upper end segments of the series of riser tubes one of which is indicated at 29 having an end segment 29A. A discharge conduit at 30 leads outwardly and downwardly from the collector to the remainder of the system which is analogous to the remaining system of FIG. 1. In FIG. 5, the vapor condenser is in the form of a vessel 31 in communication with header 28 and served by an inlet line 32 (shown in phantom lines) in end communication with the vessel. An outlet port at 33 directs liquid from vessel 31 into a return conduit 34 which transfers liquid to a collector inlet manifold such as that earlier described.

Vapor entering header 28 in the form of liquid propelling bubbles, passes into vessel 31 via multiple vapor passageways 35 whereat the vapor is condensed during normal collector operation by the cooler returning liquid in vessel 31 and merges therewith in the vessel interior. Accordingly, the vapor pressure within header 28 and vessel 31 is at a level conductive to bubble nucleation in the riser tubes as at 29 with system operation automatically ceasing when the vessel contained liquid is of elevated temperature and hence ineffective to dissipate vapor pressure in header 28.

The heat exchanger coil, generally at 18 in FIG. 1, is of a volume exceeding that of header 8 so as to function as a vapor trap during night or other non-pumping periods. The downwardly directed conduit segments at 17A-21A prevent the escape of vapor from the coil. Coil formation in parallel between the conduit segments minimizes the possibility of vapor lock.

In one embodiment of the system the riser tubes are of $\frac{3}{8}$ inch O. D. copper tubing with the plates attached thereto also being copper of light gauge. The header 8 may have a diameter of about $1\frac{1}{2}$ inches I. D. The return conduit segment 22 constituting the vapor condenser in the first described form of the invention may be of $\frac{1}{2}$ inch I.D.

In explaining the operation, the following should be kept in mind. The boiling point of a liquid is attained when the vapor pressure of the liquid equals or exceeds the pressure of the ambient vapor. When only a liquid and its vapor are contained in an hermetically sealed vessel, the state is called a "Torricelli vacuum", and the liquid is said to be at its "boiling point" at all temperatures because the ambient vapor is only that vapor from the liquid itself. If the liquid is heated at a given rate and the vapor is cooled at the same given rate, steady state boiling occurs in the liquid, producing a small mechanical action.

The solar heating system described here uses the principle described above, employing a small amount of mechanical action generated by steady state boiling to circulate the heated liquid from the source, i.e., the collector, to an end use, i.e., a storage receptacle located below the solar panel.

The riser tubes, header, heat exchangers and all connecting tubes comprise a continuously connected, hermetically sealed system containing only the heat transfer liquid and its vapor. The liquid level volume is such as to reach the bottom of the header and the top of header outlet 17 when the system is quiescent.

During normal operation, insolation heats the riser tubes to a temperature exceeding that of the vapor condenser, producing boiling, which lifts slugs of heated liquid from the riser tubes into the header, which produces a gravity imbalance between the header and the riser tubes, which circulates heated liquid downward from the header to the storage heat exchanger. The heated liquid is not cooled by contact with vapor condensor 22. Cool liquid returning from the storage heat exchanger passes through the storage condenser conduit 22 on its return to the inlet manifold, thus maintaining the temperature difference required for steady-state boiling.

At such time as the liquid returning from the storage heat exchanger warms to a temperature approaching that of the riser tubes, or when the riser tube temperature falls, the system automatically shuts down. When the header cools far below the storage temperature, the vapor in the header condenses and a vapor volume forms in the vapor heat exchager, effecting a vapor trap and preventing back siphoning of the liquid.

At such time as the temperature of the riser tubes sufficiently exceeds that of the storage receptacle, the vapor volume in the storage heat exchanger condenses while a vapor volume forms in the header and geyser pumping resumes.

The self-pumping solar heating system is prepared for operation as follows. The system is evacuated by means of a vacuum pump. The heat transfer liquid is then introduced whil the header is warmer than the storage heat exchanger, the liquid level being adjusted to the top of header outlet conduit 17. One suitable liquid would be a water-methanol solution of 70/30 by weight.

While we have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A self pumping heating system for exposure to a heat source, said system comprising,
    a collector including an inlet manifold and a header, a multitude of inclined riser tubes for exposure to the heat source and in communication with said inlet manifold and said header, said header receiving liquid and vapor discharged from said riser tubes and separating same by gravity,
    a vapor condenser vessel disposed adjacent said header, vapor passageways communicating said header with said vapor condenser,
    a discharge conduit passing downwardly from said header, said discharge conduit in upstream communication with the lowermost portion of said header to receive a gravitating liquid flow therefrom,
    heat exchanger means located below said collector and receiving heated liquid from said discharge conduit,
    a return conduit carrying liquid cooled in the heat exchanger means in upstream communication with said heat exchanger means and in downstream communication with the inlet manifold of the collector, a segment of said return conduit being said vapor condenser vessel wherein the cooled liquid normally being of a temperature lower than the riser tube discharged vapor serves to condense the vapor into condensate to provide a header vapor pressure conducive to a geyser pumping action in said riser tubes, said return conduit carrying a merged flow of said condensate and the heat exchanger cooled liquid to said inlet manifold, said pumping action lifting liquid from the riser tubes and hence causing a difference in liquid levels between the liquid level in the riser tubes and the higher liquid level in the discharge conduit whereby liquid will circulate through the system because of a gravity imbalance, and
    a liquid medium of a volume to substantially occupy the system components at operating temperatures with the exception of said header with fluid vapor occupying the remainder of the system.

2. The system claimed in claim 1 wherein system operation is automatically initiated by the presence of a temperature difference between the liquid within the vapor condenser and the vapor within the header and conversely system operation being terminated by the absence of a temperature differential therebetween.

* * * * *